July 30, 1940.  J. C. HORNUNG  2,209,566
REGULATING APPARATUS
Filed Oct. 31, 1936   2 Sheets-Sheet 1

INVENTOR:
JOHN C. HORNUNG
BY John H. Nelson
ATTY.

July 30, 1940.  J. C. HORNUNG  2,209,566
REGULATING APPARATUS
Filed Oct. 31, 1936  2 Sheets-Sheet 2
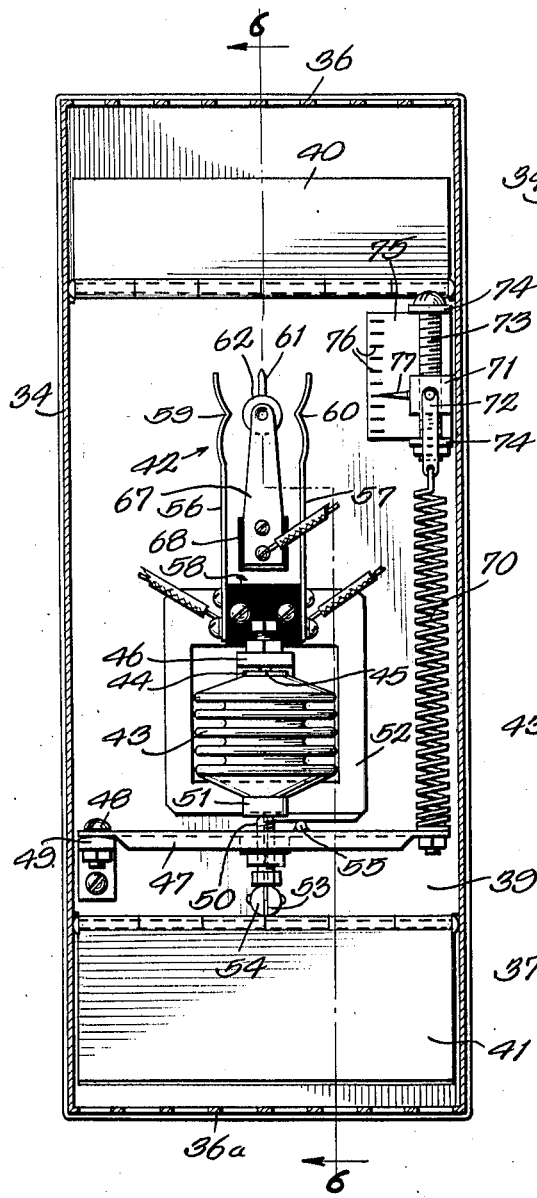
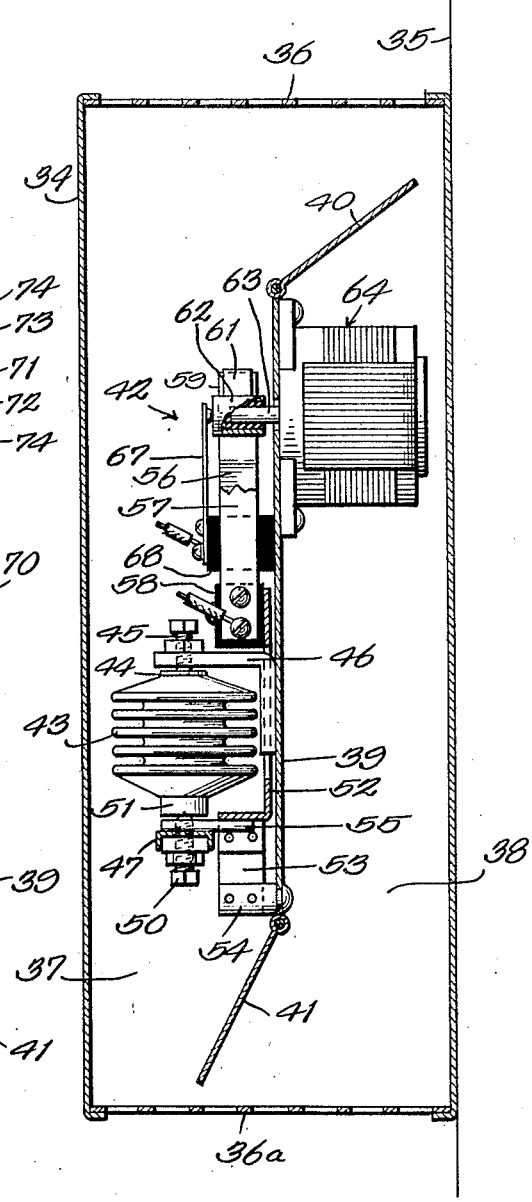
INVENTOR:
JOHN C. HORNUNG
BY John H Nelson
ATTY.

Patented July 30, 1940

2,209,566

UNITED STATES PATENT OFFICE 2,209,566

REGULATING APPARATUS

John C. Hornung, Glencoe, Ill., assignor to Illinois Engineering Company, Chicago, Ill., a corporation of Illinois Application October 31, 1936, Serial No. 108,609

7 Claims. (Cl. 236—74)

This invention relates to regulating apparatus, and generally aims to provide means by which a variable condition, such as temperature, rate of flow or movement etc., may be controlled in accordance with various positions of a movable element, whereby the condition will fluctuate in value at a regular variable or between fixed limits resulting in a mean-constant value at a given position of the element, and so that the condition will fluctuate in value at an irregular variable or between limits changing at each successive cycle of fluctuation proportionately to displacement of the element from its said position and thereby resulting in a mean-changing value of the condition deviating from said mean-constant value commensurate with movement of the element. Although the invention may be employed in various types of governing organizations, it is of particular utility when employed in connection with temperature regulation systems.

In this connection, it is one of the objects of the invention to provide such means whereby a thermo-responsive element will so control the pressure or rate of flow of a fluid temperature conditioning medium through a radiating means as to cause same to fluctuate between fixed limits resulting in a mean-constant rate of flow commensurate with that required in causing a mean-effective temperature in the radiating means capable of maintaining a predetermined temperature in that to be temperature regulated thereby, and, in the event of a fluctuation in temperature in that to be regulated, the element will be so influenced as to cause the medium to fluctuate between limits in rate changing at successive cycles of fluctuation of the medium proportionately or in step with the temperature demand, in restoring predetermined temperature in that regulated. By this method of temperature regulation, over-correction due to time lag is practically eliminated.

The invention is mainly concerned with heating systems employing a valve, or valves, to control the flow of the heating medium through a radiator contained within an enclosed space, such as a room to be heated and electrically operated means such as two electric motors, or a reversing motor, to respectively open and close the valve. Therefore, in carrying out one embodiment of the invention in connection with such an organization, a room temperature regulator is provided in the form of a thermo-responsive switch for alternately energizing the motors during like periods when responding to a predetermined room temperature, and when responding to a change in room temperature the periods of energization of the motors will differ respectively and proportionately to such change in temperature, and with means cooperating between the valve and motors to cause the valve to alternately partially open and partially close amounts respectively equal when the motors are energized at like periods or unequal when the motors are energized at different periods, thereby effecting either a mean-constant rate of flow of the medium or a mean-changing rate of flow thereof deviating from said mean-constant rate in proportion to such change in temperature in restoring normal temperature in the room. By this manner of regulation, close coordination is maintained between the temperature regulator, or thermo-actuated switch, and the valve, thus synchronizing variations in flow of the heating medium with the heat requirement and preventing out-of-step operation.

Other objects and advantages will become apparent by reference to the specification and the accompanying drawings, in which:

Fig. 5 is a front sectional elevation of the regulator or thermo-actuated switch of the invention.

Fig. 6 is a vertical section of Fig. 5, as taken substantially on the section line 6—6 of said figure.

Figure 1:
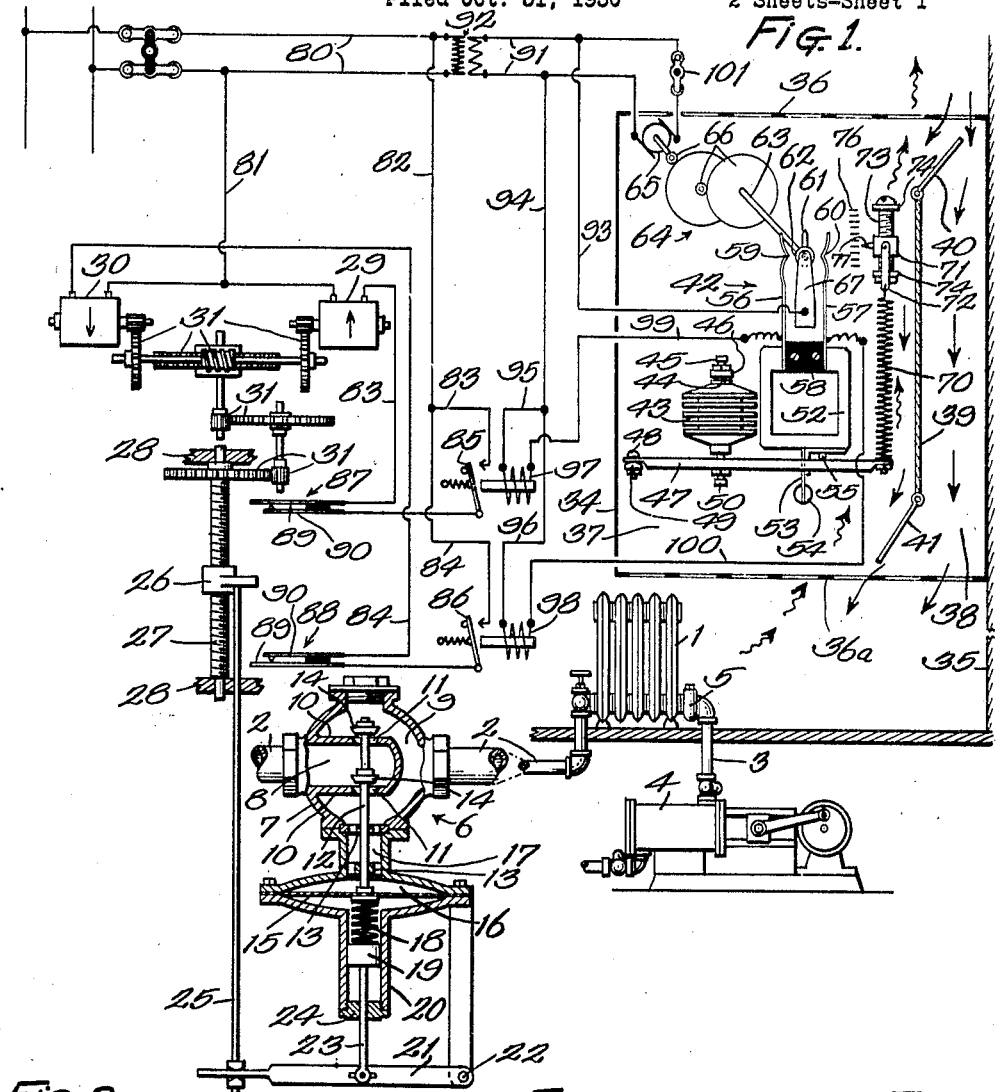
Fig. 1 is a diagrammatic illustration of the heating system embodying the invention.

Certain structure herein disclosed in connection with which the present invention forms one embodiment, forms substantially part of the subject matter of my Patent Number 1,919,330, of July 25, 1933, and my Patent Number 2,103,113, of December 21, 1937, in which said structure is generally disclosed and claimed.

Of the many types of heating systems in association with which the present invention could be advantageously employed, that illustrated in disclosing one embodiment of the invention, comprises a steam heating system of the vacuum-return type.

As illustrated, the system includes radiating means, such as a radiator 1, connected in supply communication with a steam supply conduit or pipe 2, and from which radiator continues a steam-condensation-return conduit or pipe 3 through which the condensate passes back to the boiler (not shown) by way of a suitable vacuum pump 4, and which passage is controlled by the usual thermostatic valve 5 in the return pipe 3.

In the steam supply pipe 2 is a pressure controlled valve device 6 for regulating the flow or pressure of the steam to the radiator, and which is arranged to be responsive to pressure of the steam. Said valve includes a valve housing 7 comprising a steam inlet compartment 8 extending within a steam outlet compartment 9 opening into the radiator side of the supply pipe 2. In the opposed wall portions 10 separating the compartments are aligned valve ports 11 respectively, of the conical or tapered seat type, through which extends centrally, a valve stem 12 which is reciprocably mounted in suitable bearings 13 in the valve housing, and on which stem are mounted pressure controlled valve-opening and closing members 14 which respectively control the valve ports 11. By this valve arrangement, any fluid pressure exerted upon one valve member is neutralized by equal fluid pressure exerted on the other valve member. The valve members 14 are operated to increase or decrease the area of the valve ports respectively upon a decrease or increase of steam pressure in the outlet compartment 9 of the valve housing, by means of a pressure responsive element or diaphragm 15 through which the valve stem 12 extends in fixed connection therewith so as to be reciprocated thereby. The diaphragm is caused to respond to steam pressure in the valve compartment 9 by same forming the movable wall of an expansible chamber 16 communicating with said compartment through a restricted passage 17 through which the valve stem extends. Thus as the steam pressure in the compartment 9 tends to increase beyond the determined resistance of the diaphragm, the valve members will be operated to restrict the valve ports until the pressure of the steam in the radiator is again reduced to that in balanced relation with the resistance of the diaphragm. If the steam pressure decreases, it is obvious the opposite result is attained.

Means is also employed for controlling the pressure resistance of the valve diaphragm to determine desired steam pressure in the radiator. Of the various means that could be employed in this connection, one suitable for the present invention comprises a counter-balance or counterpoise. The counterpoise is arranged adjustable and includes a resilient member such as a coiled spring 18 interposed between the valve diaphragm and an adjustable stop or plunger 19 slidably mounted in a cylindrical guide portion 20 of the valve housing and which is arranged central with the valve stem. The stop or plunger 19 is moved back and forth to various positions in the guide portion 20 to regulate the pressure exerted on the diaphragm by the spring 18, by means of a lever 21 pivoted at one end, as at 22, and at whose central portion is pivoted one end of a plunger stem 23 connected with the stop plunger and being reciprocably mounted in a bearing 24 of the guide portion. The lever 21 has its free end pivotally connected to one end of a connecting link 25 whose other end is connected to a reciprocable member or nut 26 mounted on, so as to be moved by, a rotatable screw shaft 27 suitably mounted for rotation in fixed supports 28, so that upon rotation of the screw shaft in opposite directions the lever is correspondingly oscillated. The screw shaft is driven by two electric motors 29 and 30, respectively, so as to effect, through the resilient member or spring 18, the closing and opening of the valve ports through the intermediation of suitable reduction gearing 31, when the motors are alternately energized.

In accordance with the invention, a temperature regulator or thermo-controlled switch is provided to control operation of the motors 29 and 30 alternately at given cycles, whereby to alternately increase and decrease the pressure resistance of the resilient member or spring 18 at a regular variable at each cycle when the switch is under the influence of a predetermined temperature, and so that the net rate of flow of the steam to the radiator will be practically constant in accordance with such temperature, and, in the event of a change in temperature influencing the switch, said switch will so function to render the variable irregular or unbalanced accordingly, wherein the periods of energization of the motors will be commensurately greater and shorter, respectively, during each cycle of operation of the switch to result in a mean change in the rate of flow of the steam to the radiator in accordance with that required to produce a mean-effective temperature in the radiator capable of restoring or maintaining a given temperature in that to be temperature regulated, such as an enclosed space, room or rooms.

The counterpoise, or resilient member 18, for the valve 6 is so arranged as to regulate the resistance of the valve to pressure of the steam in the system, when above, at, or below zero gauge pressure. To this end, the spring 18 of the counterpoise is connected to the valve diaphragm 15 and the adjustable stop 19, so that when the stop passes a given neutral position in reducing compression of the spring, as controlled by the switch, the spring becomes tensioned, thus causing the diaphragm to accordingly resist vacuum in the system in order to restore the steam pressure to that desired.

The temperature regulator of the invention includes an elongated box-like housing 34 adapted to be mounted vertically upon the wall 35 of an enclosed space, such as a room, or rooms, and has perforated end walls 36 and 36a to permit passage of air therethrough. The housing is divided into front and rear air passages 37 and 38, respectively, by a partition 39 at whose ends are hingedly mounted for angular adjustment, dampers 40 and 41, respectively, for controlling the flow of air through the air passages for a purpose dwelt upon later, and as more completely defined in said patent. It may be stated that the hinged connections for the dampers may be so arranged whereby the dampers are held in adjusted positions by friction.

Within the front air passage 37 of the switch housing 34 is disposed the thermo-controlled switch 42, comprising a thermo-responsive element 43 in the form of an expansible hollow diaphragm containing a suitable volatile fluid. The diaphragm 43 has a top end 44 engaging an adjustable stop 45, in the form of an adjusting screw, threaded through a mounting post 46 on the partition 39 of the switch housing. The diaphragm is held in engagement with the stop 45 by leverage means comprising a spring-pressed horizontal lever 47 which is pivotally mounted at one end, as at 48, on a mounting post 49 of the partition 39, and having an adjusting screw 50 threaded through its central portion for pressure engagement with the lower movable end 51 of the diaphragm. The lever 47 is operably connected with a vertically arranged switch lever 52 for rocking same back and forth as the diaphragm 43 expands or contracts under the influence of differing temperatures. The switch lever is arranged between the switch diaphragm 43 and the partition 39, and is of rectangular formation with a central opening through which the mounting post 46 extends. Continuing centrally from the bottom end of the switch lever, in fixed connection therewith, is a short leaf spring 53 which is secured to a mounting post 54 on the partition 39 for providing a pivotal connection for the switch lever. The spring-pressed lever 47 has an abutment or lateral pin 55 thereon for engaging the lower edge of the switch lever 52 to one side of its center to operate same upon expansion and contraction of the switch diaphragm, said engagement being maintained by the leaf spring 53. Extending from the upper end of the switch lever are two spaced circuit-closing elements 56 and 57 in the form of leaf springs which are secured at their lower ends upon opposite sides of a mounting block 58, of insulating material, secured on the upper end of the switch lever.

The upper free ends of the circuit-closing members 56 and 57 are formed into opposed inwardly tapered contact-engaging portions 59 and 60, respectively, which are arranged to project into the path of a rotating circuit-continuing element or contact 61 comprising a lateral projection on a rotating shaft portion 62, whereby said tapered portions will have varying durations of sliding engagement with the contact when the switch lever is shifted from a neutral position. The contact and circuit-closing members are operably connected with the motors of the valve, whereby power circuits for the motors 29 and 30 are alternately established as the contact alternately engages the members 56 and 57, respectively.

Figure 2:
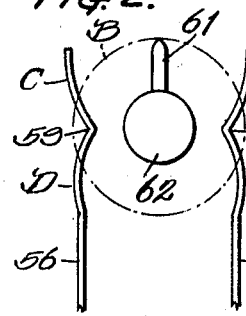
Fig. 2 is an enlarged detail view of certain parts of the regulator or switch of the invention as seen in Fig. 1.

The switch lever 52 is arranged to assume a neutral position with its tapered portions 59 and 60 partially projected equally into the path of the rotating contact, as seen in Figs. 1, 2 and 5, when the switch diaphragm 43 controlling same is under the influence of a predetermined temperature of the enclosed space or room. Thus upon rotation of the contact it alternately engages said portions during like periods to alternately energize the motors of the counterpoise at like periods, and thereby resulting in a back and forth movement of the valve members 14 within fixed limits or at a regular variable under a given steam pressure in the radiator. The contact portions 59 and 60, the motors 29 and 30, the speed reducing gearing 31, the screw shaft 27 and the lever 21 are so arranged that upon each revolution of the contact 61, when the switch lever 52 is in its neutral position, the range of back and forth movement of the valve members 14 will be considerably less than their range of movement to fully open and fully close the valve ports 11. In the event the switch diaphragm 43 should expand under the influence of an increase in temperature, the switch lever 52 would be shifted from its neutral position so that its tapered contact-engaging portions 59 and 60 would shift toward and away from the path of the contact 61, respectively, and whereby the portions of the surfaces of said tapered portions intercepting the path would be lengthened and shortened respectively and proportionately to such increase in temperature. In this position, the contact-engaging portions 59 and 60 cooperate with the rotating contact during each cycle of rotation thereof to energize the valve-closing motors 29 and 30 alternately during periods respectively differing in length proportionately to such increase in temperature, which results in a back and forth movement of the valve members 14 of the valve 6 at an irregular variable, or within ranges in opposite directions respectively differing in proportion to such change in temperature, whereby upon each cycle of back and forth movement of said members they will advance toward the ports 11 an amount equal to the difference between their ranges of movement in opposite directions and thereby effecting a mean-decreasing rate of flow of the medium in the radiator that will be in accordance with such change in room temperature, in restoring normal temperature in the room. In the event the switch should respond to a decrease in temperature of the enclosed space or room below that desired, it is obvious the periods of energization of the motors 29 and 30 would be accordingly decreased and increased respectively, thus resulting in a net movement of the valve members 14 away from the valve ports to increase the flow of steam to the radiator in accordance with that demanded by the switch, in restoring temperature in the enclosed space or room to normal.

When the switch lever 52 is in its neutral position, each tapered contact-engaging portion thereof intercepts about one-eighth of the periphery of the path of the contact, as seen in dot and dash lines B in Fig. 2, whereupon the valve 6 will be caused to remain in a certain position during about three-eighths of the revolution of the contact after having been actuated by engagement of the contact with either contact-engaging portion.

Figure 3:
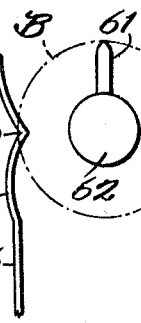
Fig. 3 is a view similar to Fig. 2, with certain parts in changed position.
Figure 4:
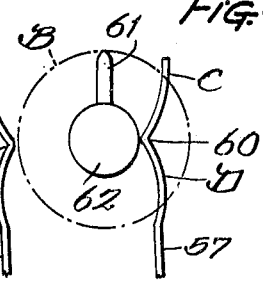
Fig. 4 is a view similar to Figs. 2 and 3, but with said parts in another changed position.

The contact-engaging portions 59 and 60 are so formed as to cause the valve members 14 of the valve 6 to dwell at like periods at various positions of the switch lever. To this end, said portions comprise concaved side portions C and D tapering from the apexes of the portions, and arranged so that when moved toward and away from the path of the contact, respectively, upon displacement of the switch lever from its neutral position, the durations of engagement between said portions and the contact at a cycle of rotation thereof, will be correspondingly increased and decreased, as seen in Fig. 3. The portions 59 and 60 are so spaced that when the tip or apex of one engages the shaft portion 62 of the contact, the tip of the other portion will be out of the path, and thereby resulting in constant energization of the motor controlled by said portion engaging the shaft portion, and thus causing the valve members 14 to move constantly in a certain directiton to open or close the valve ports when the switch is under the influence of an extreme change in temperature from that desired, with the said portions thereof in the position as seen in Fig. 4.

Although the rate of rotation of the contact 61 may depend upon the type of system the switch or regulator is to be associated with, and/or the conditions under which it is to function, for ordinary systems it is arranged to complete one revolution per minute to cause the heating medium to pulsate through the radiator at one minute cycles. For operating the contact, its shaft portion 62 is arranged in the form of a sleeve mounted on, so as to be insulated from, a drive shaft 63 of a slow-speed electric power unit 64 which is mounted on the partition 39 of the switch housing and within the compartment 38 thereof. As seen in Fig. 1, the power unit includes an electric motor 65 in driving connection with the drive shaft 63 through speed-reducing gearing 66. The shaft portion 62 of the contact is engaged at its end by a resilient circuit-continuing terminal 67 in the form of a leaf spring mounted on a terminal block 68, of insulating material, secured on the partition 39 of the switch housing, and which terminal serves as a common connection between the contact and the motors 29 and 30 of the counterpoise, as described later.

Means is provided for regulating the resistance of the switch diaphragm 43 to determine the normal or desired temperature of the enclosed space, room or rooms, at which the switch is to function at a regular variable in accordance with the invention as described. Said means includes a vertically disposed coiled tension spring 70 whose upper end is connected to a vertically adjustable anchorage 71, and whose lower end is connected to the free end of the lever 47 for urging the lever against the diaphragm 43 under various pressures to control its resistance according to desired temperatures. The anchorage 71 comprises a threaded slide, or block, connected with the upper end of the spring 70 through a link 72, and being mounted for vertical adjustment upon a vertically arranged adjusting screw 73 rotatably mounted at its ends in bearings 74 of a bracket 75 secured on the partition 39. The bracket serves as a guide for the slide and has vertically spaced temperature indicia, or indicating marks 76, for registration with the indicator 77 on the slide to determine the proper tension of the spring 70 at a desired temperature to be maintained in the enclosed space or room, so that the switch may function accordingly. It may be stated that when the slide is adjusted to a given position, the switch lever 52 is adjusted to neutral position by adjustment of the adjusting screw 50, in the event the lever has been shifted by compression or expansion of the switch diaphragm as effected by adjustment of the spring 70.

The contact 61 and the circuit-closing members 56 and 57 are operably connected with the motors 29 and 30 of the counterpoise so as to alternately energize same in accordance with the invention as described generally, by means of the following. As illustrated diagrammatically in Fig. 1, the said means includes high-voltage electric power lines 80, for example, 110 volts, with one side connected to one side of the motors 29 and 30 by the conductor 81, and with the other side of the power lines connected to the other side of the motors by a conductor 82 having branches 83 and 84 continuing to the motors, respectively. In the branches 83 and 84 are included magnet-operated relay switches 85 and 86 respectively controlling energization of the motors 29 and 30, through intermediation of normally closed limit switches 87 and 88 included respectively in the branches. The limit switches are arranged at the limits of the range of movement of the nut 26 on the screw shaft 27, and may comprise normally engaging spring members 89 and 90 which are arranged to be opened upon one being engaged by the nut at the end of its travel to open the circuit of the motor effecting such movement of the nut.

The relay switches 85 and 86 are respectively closed by the circuit-closing members 56 and 57, when same engage the contact 61 alternately, by means of the low-voltage power lines 91, for example, 6 volts, of a transformer 92 included in the power lines 80. One side of the power lines 91 is connected with the terminal 67 of the contact 61 by a conductor 93, and from the other side of the lines continues a conductor 94 with branches 95 and 96 connected respectively with one side of the magnets 97 and 98 controlling the relay switches 85 and 86, with the other side of said magnets being connected respectively with the circuit-closing members 56 and 57, by the conductors 99 and 100. The power lines 91 may also be connected with the motor 65 for operating the contact 61, with a switch 101 included in one of the lines to control the operation of the thermo-controlled switch so that it may function in accordance with the invention as disclosed, or function as an ordinary thermostat with the contact remaining stationary.

The particular purpose of the switch housing 34, as covered by and more completely disclosed in said patent, is to render the thermo-responsive switch responsive to the mean temperature between the cold and warm air currents circulating along the wall, of the enclosed space or room, on which the housing is mounted, in controlling the temperature of said space or room in accordance with the resistance of the wall to exterior temperatures. For instance, in the event of a sudden drop in exterior temperature, a cold air current will be caused to flow downward along the wall surface, as shown by the straight arrows in Fig. 1, the temperature of which current and its commencement will be dependent upon the thermal resistance of the wall, so that if the wall offers little resistance, more heat is required in the space or room, and the greater its resistance, less heat is required. If the wall offers little resistance, the top damper 40 of the switch housing is adjusted to admit more of the cold air current into the compartment 37 of the housing, and the bottom damper 41 of the housing is adjusted to admit into said compartment a slight amount of the warm air current flowing upward along the wall as effected by the radiator, as indicated by wavy arrows in Fig. 1, whereby the thermo-responsive switch will respond to the mean temperature between the opposing air currents that is in accordance with the thermal resistance of the wall.

By virtue of the structure described, it may be broadly stated that a precision instrument has been provided in the class of regulators, capable of regulating a variable condition, such as temperature, rate of flow or movement etc., by the use of a movable element, wherein the condition is caused to fluctuate in value at a regular variable resulting in a mean constant value of the condition when the element is at a given position, and wherein the opposing factors of the variable will increase and decrease proportionately in magnitude, respectively, in accordance with displacement of the element from its said position, thus resulting in a mean change in the value of the condition commensurate with and upon movement of the element.

Of the many advantages attained by the use of the regulator of the invention in connection with heating systems, as described, one main advantage is, that while the steam pulsates in the radiator it is continuously circulating therethrough to effect a net acceleration in rate of flow in the radiator at all times proportionately to and practically at the time of a temperature demand, in that the constant partially opening and closing action of the valve, as controlled by the regulator, renders same anticipatory of a change in demand by the regulator whether same is responding to a predetermined temperature or otherwise, and whereby the mean rate of flow of steam and the temperature thereof will always be in accordance with the temperature demand of the radiator.

Having thus described my invention, I claim:

1. In apparatus of the class described, a valve, electrically operated means for opening and closing the valve, a thermo-responsive element, a rotating contact member in an electric circuit, two parallel spaced apart contacts in the path of the rotating contact adapted to close the circuit one to energize the valve opening means and the other to energize the valve closing means, said spaced apart contacts and rotating contact arranged for relative adjustment controlled by the thermo-responsive element to control the duration of engagement of the respective spaced apart contacts with the rotating contact to impart a continuous fluctuation in the opening and closing means in the direction in approaching the opening and closing positions.

2. In an electrically operated and controlled temperature conditioning system, a valve controlling the supply of the temperature conditioning medium, means for opening and closing the valve, thermostatic means responsive to changes in temperature of the space to be temperature conditioned, a constantly rotating contact member in an electric circuit, two parallel spaced apart contacts in the path of the rotating contact adapted to close the circuit one to energize the valve opening means and the other to energize the valve closing means, said spaced apart contacts and rotating contact arranged for relative adjustment controlled by the thermostatic means to control the duration of engagement of the respective spaced apart contacts with the rotating contact to impart a continuous fluctuation in the opening and closing means in the direction in approaching the opening and closing positions.

3. In an electrically operated and controlled heating system, a valve controlling the supply of the heating medium, means for opening and closing the valve, thermostatic means responsive to changes in temperature of the space to be heated, a constantly rotating contact member in an electric circuit, two parallel spaced apart contacts in the path of the rotating contact adapted to close the circuit one to energize the valve opening means and the other to energize the valve closing means, said spaced apart contacts being actuated by the thermostatic means to control the duration of engagement of the respective spaced apart contacts with the rotating contact to impart a continuous fluctuation in the opening and closing means in the direction in approaching the opening and closing positions.

4. In an electrically operated and controlled temperature conditioning system, a valve controlling the supply of the temperature conditioning medium, means for opening and closing the valve, thermostatic means responsive to changes in temperature of the space to be temperature conditioned, a constantly rotating contact member in an electric circuit, two spaced apart contacts arranged at opposite sides of the axis of rotation of the contact member being in the path of the contact member so as to be alternately engaged thereby and adapted to close the circuit one contact to energize the valve opening means and the other to energize the valve closing means, means operably connecting said spaced contacts with the thermostatic means to cause the spaced contacts to shift in unison into various positions toward and away from said axis respectively in accordance with changes in temperature influencing the thermostatic means, and said spaced contacts having contact engaging portions formed to cooperate with the rotating contact member to impart a continuous fluctuation in the opening and closing means in the direction in approaching the opening and closing positions proportionately to the various positions of the spaced contacts with respect to the rotating contact member.

5. In apparatus of the class described, a constantly rotating shaft having a laterally disposed contacting projection, two spaced apart contacts arranged at opposite sides of the axis of the shaft and in the path of the projection so as to be alternately engaged thereby, means to shift said spaced contacts in unison into various positions toward and away from said axis respectively, and said spaced contacts having portions formed to be engaged by the projection during like periods at one position of the spaced contacts and to be engaged during periods correspondingly increased and decreased respectively with respect to said like periods at various positions of the spaced contacts displaced from the aforesaid position.

6. The structure as defined in claim 5, wherein said portions of the spaced contacts are tapered toward the axis of the shaft and having concaved contact-engaging side portions.

7. The structure as defined in claim 5, wherein the spaced contacts comprise substantially parallel metallic strips, and wherein said portions comprise portions of the strips bent into tapered formations tapering toward said axis of the shaft and having concaved contact-engaging side formations.

JOHN C. HORNUNG.